United States Patent [19]

Morrison

[11] Patent Number: 4,698,225

[45] Date of Patent: Oct. 6, 1987

[54] GRANULAR BINDING AGENT FOR PELLETS

[76] Inventor: David G. Morrison, 3150 Glen Oaks Ave., White Bear Lake, Minn. 55110

[21] Appl. No.: 723,620

[22] Filed: Apr. 15, 1985

[51] Int. Cl.$^4$ .............................................. A23K 1/20
[52] U.S. Cl. ...................................... 426/96; 426/302; 426/454; 426/623; 426/630
[58] Field of Search ................. 426/630, 623, 635, 74, 426/454, 658, 807

[56] References Cited

U.S. PATENT DOCUMENTS

| | | | |
|---|---|---|---|
| 2,905,558 | 9/1959 | Adams | 426/807 X |
| 2,926,085 | 2/1960 | Geerlings | 426/74 |
| 3,035,920 | 5/1962 | Knodt | 426/623 |
| 3,246,336 | 4/1966 | Baribo et al. | 426/658 |
| 3,532,503 | 10/1970 | Kviesitis | 426/807 X |
| 4,034,120 | 7/1977 | Wortham et al. | 426/635 |
| 4,212,890 | 7/1980 | Tiefenbacher et al. | 426/454 |

FOREIGN PATENT DOCUMENTS

| | | | |
|---|---|---|---|
| 0089849 | 9/1983 | World Int. Prop. O. | 426/423 |
| 0656610 | 4/1979 | U.S.S.R. | 426/454 |

OTHER PUBLICATIONS

Grant "Hackh's Chemical Dictionary" 4th edition 1969 page 493.
Chem Abs. Vol. 82: 199736w (1977).

*Primary Examiner*—R. B. Penland
*Attorney, Agent, or Firm*—Orrin M. Haugen; Thomas J. Nikolai

[57] ABSTRACT

A binder ingredient for pelleted feeds comprising a direct binding agent present as a dry thin film layer or coating upon a solid particle of organic nutrient-filler. The dry thin film layer or coating comprises a water soluble lignin sulfonate such as calcium lignin sulfonate, while the organic nutrient-filler comprises granular dried reed sedge peat. The binder is mixed with the feed ingredients in a desired range, such as in the range of approximately 2 percent by weight, to form a pelleted feed.

3 Claims, 1 Drawing Figure

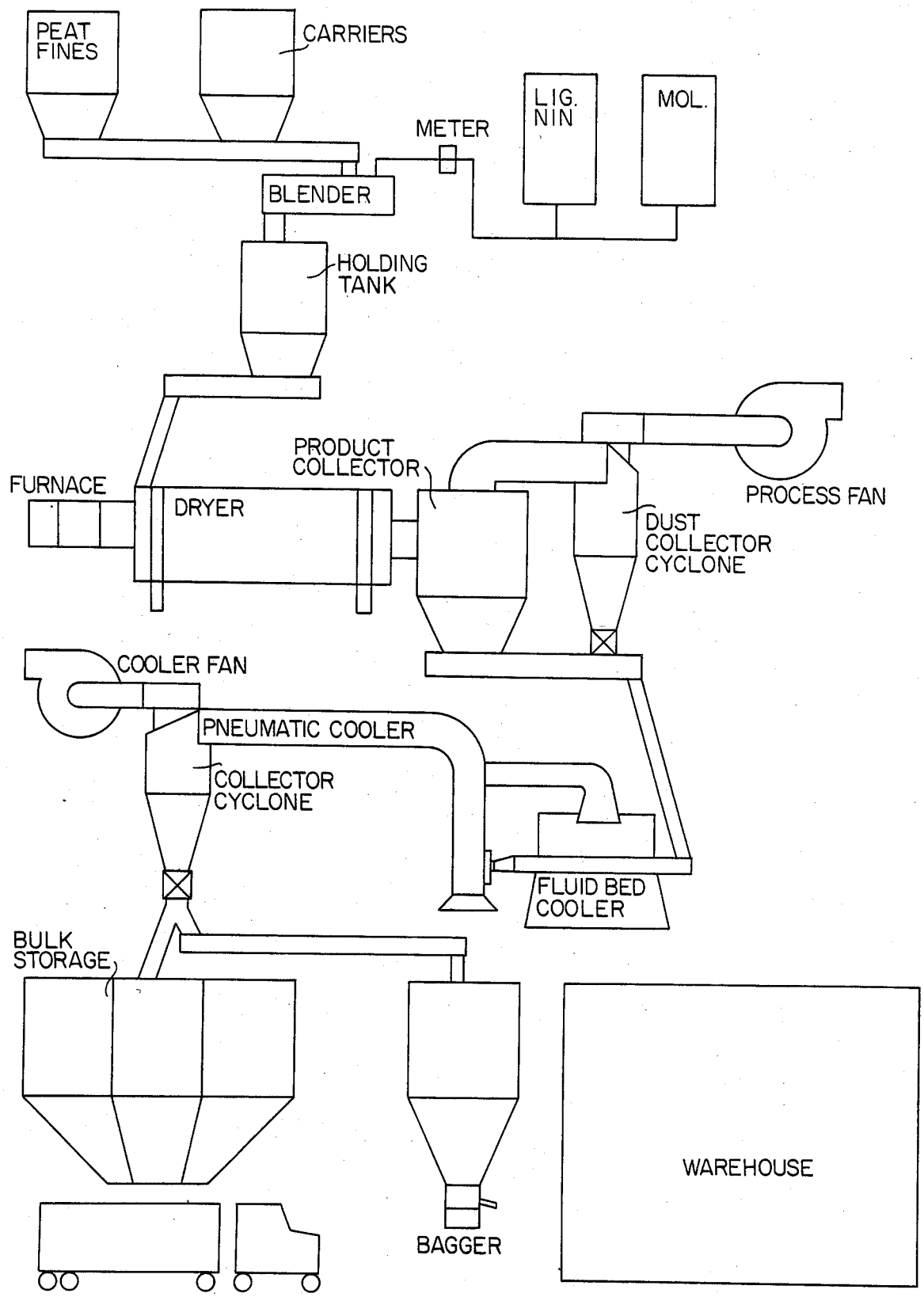

GRANULAR BINDING AGENT FOR PELLETS

BACKGROUND OF THE INVENTION

The present invention relates generally to improved supplements for pelleting feeds and more particularly to novel artificial binding ingredients for pelleting feeds based, in part, on a water soluble lignin sulfonate.

Pelleted feeds, which have been defined as agglomerated feeds formed by extruding individual ingredients or mixtures by comparting and forcing through die openings by any mechanical process, are widely used as feed for animals and poultry. It is well known that animals make better weight gains when fed on pelleted feed than when fed on a meal ration for the following reasons:

1. The heat generated in conditioning and pelleting makes the feedstuff portion more digestable by breaking down the starch components therein;
2. Pelleted feeds allows animals and poultry to better utilize the nutrients in the feed ingredients;
3. The pellet simply places the feed in a concentrated form;
4. Pelleting minimizes waste during the eating and consumption process;
5. Pelleting reduces the segregation in mixing, handling and feeding processes; therefore each animal receives a well-balanced diet by preventing the animal from its tendency to pick and choose between a number of ingredients placed before it.

The basic purpose of pelleting is to take a finely divided, sometimes dusty, unpalatable and difficult-to-handle feed material and, through the use of heat, moisture and pressure, form it into large particles, which have better flow and handling characteristics and which are normally more palatable. Bulk density and properties relating to shipping are also increased which enhances storage capabilities of most bulk facilities and contributes to a reduction in transportation costs.

Feed ingredients normally comprise formulations of various compounds such as proteins, acids, guars, fibers and minerals. Various ingredients have characteristics that require different forms and levels of heat-moisture treatment during the pelleting operation. When a sufficiently large and controlled compressive force is applied to the "conditioned" feed ingredients they form a dense mass shaped to conform to the die against which they are pressed. After drying and cooling, the resultant shaped mass (the pellet) retains its shape and density and is of such "toughness" as to withstand moderately rough handling without excessive fracture, rupture or breakage, and additionally it has retained or enhanced its nutritive value.

In many cases, adequate pellet quality is not obtained through proper heat-moisture conditioning and die selection, and a binder must then be added to the feed. Two of the most widely used binders are bentonite and lignin sulfonate, with these materials normally being powderized or pulverulent solids in dried form. Unfortunately, the incorporation of high hygroscopic binders such as lignin sulfonate powder into pelleted feed formula normally leads to mixes and finished pellets having properties contributing to poor storage characteristics. Often it is difficult to handle dusty or powdered binding ingredients and it is furthermore difficult to remove them from bulk bins because of resultant caking and bin set up. Frequently, pelleting rates and pellet quality are reduced because it is not always possible to provide the adequate blending and uniform distribution of pulverized binder materials through the mixture mass. Even when well blended with the other ingredients and uniformly distributed among relatively large particles of the other ingredients, the adhesive characteristics and binding efficiency of powdery binders are relatively low due to "volumetric" nature of such binding agents.

Indeed, the large quantity or portion of the powdery binder material in the center or core part of intergranular space filled with binder does not and cannot participate in the binding function. At the same time these particles prevent steam penetration of the blended feed formula mixture. From an analysis of physical principles of pelleted grain structures with binders, it can be seen that the most efficient binding system can be obtained with the aid of particulate elements coated with binding layer and distributed uniformly over the feed mass. Therefore, better pellet quality can be produced using the binder ingredient in granular form rather than in powder-like form and with the binder component thereof being maintained on the outer surface of the granules. Furthermore, the size of the binder particles should be commensurate with the particles of the regular formula feed ingredients. Also, because the artificial binder add to the cost of a feed, they must be used in limited amounts of proportions. Hence, a binding product can be composed of certain low cost filler particles coated with relatively thin film or layer of a binding layer substance.

SUMMARY OF THE INVENTION

In accordance with the present invention, the granular material is preferably derived from peat. The peat is, of course, a readily available material, and is found in many parts of the world including a large portion of the state of Minnesota. In accorance with the present invention, peat is obtained, and subjected to a grinding and drying operation until particles of a size range of from between about 10 mesh and 50 mesh are obtained. These particles are then coated with a layer of a water soluble lignin sulfonate, including water soluble lignin sulfate selected from the group consisting of sodium, ammonium, calcium and magnesium lignin sulfonates. This material is characterized as being granular in nature, with the binder component being contained thereon as a film or coating to the outer surface of the ground-dried peat particles. Thereafter, this binder material is utilized as a pellet binder for feed, with suitable pelletized feeds being prepared when formulated to contain approximately two percent of the binder component.

Therefore, it is a primary object of this invention to provide an improved granular binding agent suitable for production of high quality feed pellets at relatively low cost, and with the solid feedstuff containing particles of a binder component which are coated on their outer surfaces with a binding film.

It is yet another object of this invention to provide a uniform granular binding agent on natural occurring solid fiber-filler coated with a film of binding layer wherein the resulting feed pellets utilizing this binding agent have improved crushing strength.

Still another object of this invention is to provide a process for production a novel uniform granular binder for feedstuffs, with the binder having a high binding quality together with improved mixing, handling and storage characteristics.

In accordance with the invention there are provided novel artificial binders for pelleted feeds in which the direct binding agent is present either wholly or partly in the state of dry thin film layer or coating upon solid particles of organic nutrient-filler, with the size of the filler particles being comparable to that of the feed ingredients to be pelletized. This novel concept has the twofold advantage of introducing into the pelleted feed composition minimal quanitity of expensive binding substance and at the same time serving to improve the mixing, handling and storage characteristics of the binder ingredient.

In accorance with the invention, we provide a process for preparing at an increased production rate a granular binding ingredients, said process comprising the following steps:

A. Drying and grinding a quantity of peat, particularly reed sedge peat until granular particles are obtained ranging in size between about 10 mesh and 50 mesh to obtain a solid granular feedstuff-filler component;

B. Admixing a liquid binding substance to the solid granular feedstuff-filler to coat the solid particles with liquid binder and impregnate the surface layer of filler particles;

C. Drying the resultant blend at a temperature within the range 190° to 300° to obtain a dried solid granular binding agent, containing about 2-5 percent water;

D. Cooling the resulting product to temperature less than 150°, then classifying and grinding it to obtain binder particles of various size, as desired.

In terms of binder-filler ratio, the proposed granular binding product preferably contains 15 to 60 percent by weight of binding substance (on a dry basis). The concentration of said binding substance in the product may be controlled by adjusting the proportion of the liquid binder admixed with the solid filler-feedstuff component.

The preferred aqueous liquid binder of this invention is a water soluble lignin sulfonate such as calcium lignin sulfonate which is derived from the sulphite wood pulping industry. It is a palatable material which produces strong pellets, reduces fire hazards, and permits the introduction of greater quantities of steam while pelleting. Lignin sulfonates such as water soluble lignin sulfonates selected from the group consisting of sodium, ammonium, magnesium and calcium lignin sulfonates normally contain a high percentage of carbohydrate compounds such as sugar and hemicellulose. Moisture content of calcium lignin sulfonate in a liquid form is about 50 percent by weight. Other aqueous liquid binders which can be used for purposes of the present invention are concentrated whey (moisture not to exceed 60 percent by weight) and hemicellulose extract (by-product of the manufacture of pressed wood containing pentose and hexose sugars and has a total carbohydrate content of not less than 55 percent and it is commercially available). Along with these liquid binders, their blends in different proportions can be used for production of granular binding products according to the present invention. For example, 50/50 percent blend of liquid lignin sulfonate and concentrated whey was found to be useful for purposes of the invention.

In addition to whey and the preferred lignin sulfonate, other liquids such as fish solubles, liquid streptomycies solubles, corn fermentation by-products, corn starch conversion by-products, corn syrup by-products, soy solubles, molasses and molasses fermentation by-products may be found useful with lignin sulfonate in part or by themselves as an ingredient in this binder invention.

While a number of cheap granular feedstuffs and organic products may be used as a filler for production of said granular binding products, namely: soybean meal, grain dust, wood flour, peanut hulls, dry alfalfa, bagasse, citrus pulp, and so on, we have found that from granular binder quality as reflected in animal growth rates, the best results are obtained when solid fillers of fibrous nature, such as reed sedge peat is used in accordance with the present invention. Along with natural binding property inherent to this fiber, these fillers contain up to 40% of natural lignin, which is known as one of the best natural binding substances. Because ingredient costs continue to be an overriding factor when formulating the final pelleted product, the low cost of such readily available binder filler as reed sedge peat makes it preferred.

More particularly, reed sedge peat is utilized in a mechanical or solar dried form, 5% to 50% moisture and ground to a fine texture. The particular molecular structure of the fiber along with the natural high lignin level in reed sedge peat was discovered to be cumulative to the binding qualities of lignin sulfonate when mixed together in this process. It is not believed that reed sedge peat has been used as a feed ingredient for a binding agent, or as a carrier for a binder in the past.

We have found that when the granular binding products are produced in accordance with the present invention and used as a pelleting aid in an amount of about 2 to 2½% of the finished regular formula feed pellets, the feed pellets that result have a hard refractory appearance and improved handling/storage characteristics. Thus, in comparison with known powdery binding product for pellets, the product of the invention appears to reduce the consumption of high-cost binding agent up to 50 percent. The new granular binding product of the invention can be handled with normal material handling techniques such as belt conveying, screw conveying, bucket elevators, trucking, and shoveling without the problems of particle degradation and formation of dust in the work area.

Moreover, the new binding product can significantly increase pellet production. While the mechanism by which the pelleting rate is increased is not known with certainty, it is suggested that uniform granular binding product, being uniformly distributed all over pelleted mixture, provides effective steam penetration through feed material, which, along with "film" binding mechanism of said binding product, results in better lubrication and increased production rates.

BRIEF DESCRIPTION OF THE DRAWING

The drawing is a schematic illustration of a typical production system for carrying out the binder preparation process of the present invention.

DESCRIPTION OF THE PREFERRED EMBODIMENT

In accordance with one preferred embodiment of this invention, liquid lignin sulfonate, containing at least 50% by weight of dry matter, is sprayed onto ground preliminary dried reed sedge peat (with moisture content 5-50%) while reed sedge peat is tumbled or mixed in suitable equiment such as continuous high RPM (300 RPM or higher), chip or blade blender. The reed sedge peat and liquid lignin sulfonate are preferably mixed at a sufficiently high temperature to provide the necessary degree of absorption of lignin sulfonate by surface portions of the reed sedge peat particles. A temperature within the range 100°–180° F. is normally used depending on the concentration of lignin sulfonate in the mixture. Direct blender steaming is preferably used for this purpose, the supplied steam pressure ranging from 15 to 100 psi. The lignin sulfonate content in the mixture at the exit of the blender should be 15% or higher on a dry weight basis. The sizes of ground reed sedge peat filler particles, fed into the blender, are preferably in the region 10–20 mesh. To prevent inadmissible deep absorption of lignin sulfonate by filler particles, the total duration of admixing process and feeding of damp mass into the following drying unit should normally not exceed 15–20 seconds.

A continuous direct-fired rotary dryer, operating at essentially atmospheric pressure, is suitable equipment for the drying operation. Product temperature in the dryer should not exceed about 300° F. and is normally maintained in the range 200°–260° F. during drying. Excessive drying temperature may decompose part of the nutritional components in the product. The filler particles, coated with lignin sulfonate, are dried within 7 to 25 minutes, sufficiently to remove most of the water but not so much so to destroy the valuable nutritional protein, vitamins and other growth factors. Accordingly, the material is reduced to a dry free flowing granular material containing water at a level less than about 6 percent. The thus prepared and dried granular binding product is preferably cooled to temperature below 150° F. within 1 to 20 minutes in such suitable equipment for the cooling operation as, for example, fluidized bed cooler, rotary drum cooler, pneumatic transport cooler and so on. To obtain granular binding product with optimum particle sizes, the classification and grinding operation may be included in the production line after the cooling system. Grinding may be effected by any of the conventional methods employing known grinding equipment, such as, for example, hammermills, and binder particles of various sizes and of different size distribution patterns, as desired, may be produced. In general, binding particles ranging in size from 0.1 inch to 0.03 inch are employed, or preferably of a size ranging from between about 10 mesh and 50 mesh.

To minimize the effect any grinding action may have on the lignin coated particulate, the product is screened after cooling and only the larger sized particulates are passed through the grinding process. This very important part of the invention insures uniform granular size with maximum coating on each granular particulate in the finished product. The fines, as well as those particles larger than the preferred range are re-cycled for re-processing.

I claim:

1. A granular binding agent for use with feed pellets comprising:
   (a) a granular solid reed sedge peat substrate having a particle size ranging from between about 10 mesh and 50 mesh, and being coated with a film of water soluble lignin sulfonate, said reed sedge peat comprising between about 40 percent and 85 percent by weight of said binding agent; and
   (b) balance of from 15 percent to 60 percent by weight comprising a water soluble lignin sulfonate selected from the group consisting of sodium, ammonium, calcium and magnesium lignin sulfonates as the dried film coating said particles; and
   (c) said lignin sulfonate film coating being in the form of a relatively thin layer on the surface of said granular peat solid, and maintained thereon by surface absorption bonds, whereby a coated granular binding agent for pelletized feed is provided.

2. A process of preparing coated granular binding agents for animal feeds which comprises the steps of:
   (a) providing a liquid binding agent for forming a film coating on the surface of said granular binding agents, with said liquid binding agent comprising a water soluble lignin sulfonate selected from the group consisting of sodium, ammonium, calcium and magnesium lignin sulfonate having a moisture content of less than about 50 percent by weight;
   (b) admixing said liquid binding agent with granular solid peat having a particle size ranging from between about 10 mesh and 50 mesh while agitating said admixture to coat said granular peat solids;
   (c) the quantity of liquid binding agent being sufficient to evenly coat said peat particles with a thin aqueous layer of said binding agent and to cause the final admixture to have a total binding agent concentration of between about 15 and 60 percent by weight on a dry basis;
   (d) said admixing process of step (b) being undertaken for a period of between about 15 and 20 seconds through direct blender steaming at a film coating forming temperature between about 100°–180° F.;
   (e) drying the admixture obtained from step (b) at a temperature within the range of from between about 200°–300° F. for a period of between about 7 and 25 minutes to obtain a dried coated granular solid material with less than about 6 percent by weight of water; and
   (f) cooling the dried product to a temperature below about 150° F. over a period of from between about 1 minute and 20 minutes.

3. The process as set forth in claim 2 further comprising a classification operation being undertaken following the drying operation defined in step (e), wherein the dried product is classified so as to select particles therefrom having a size ranging from between about 10 mesh and 50 mesh.

* * * * *